United States Patent
Vrancic et al.

(10) Patent No.: US 6,839,777 B1
(45) Date of Patent: Jan. 4, 2005

(54) SYSTEM AND METHOD FOR TRANSFERRING DATA OVER A COMMUNICATION MEDIUM USING DATA TRANSFER LINKS

(75) Inventors: Aljosa Vrancic, Austin, TX (US); David W. Madden, Austin, TX (US)

(73) Assignee: National Instruments Corporation, Austin, TX (US)

( * ) Notice: Subject to any disclaimer, the term of this patent is extended or adjusted under 35 U.S.C. 154(b) by 765 days.

(21) Appl. No.: 09/659,914

(22) Filed: Sep. 11, 2000

(51) Int. Cl.[7] ................................................. G06F 3/00
(52) U.S. Cl. ............................. 710/52; 710/8; 710/22
(58) Field of Search ................................ 710/8, 10, 11, 710/14, 22, 52

(56) References Cited

U.S. PATENT DOCUMENTS

| | | | |
|---|---|---|---|
| 5,640,399 A | * | 6/1997 | Rostoker et al. ............ 370/392 |
| 5,659,749 A | | 8/1997 | Mitchell et al. |
| 5,694,333 A | | 12/1997 | Andrade et al. |
| 6,006,286 A | * | 12/1999 | Baker et al. ................... 710/22 |
| 6,073,205 A | | 6/2000 | Thomson |
| 6,167,465 A | * | 12/2000 | Parvin et al. .................. 710/22 |
| 6,177,895 B1 | * | 1/2001 | Vrancic et al. ............. 341/132 |

* cited by examiner

Primary Examiner—Jeffrey Gaffin
Assistant Examiner—Alan S Chen
(74) Attorney, Agent, or Firm—Meyertons Hood Kivlin Kowert & Goetzel, P.C.; Jeffrey C. Hood; Mark S. Williams

(57) ABSTRACT

A system and method for transferring data over a communications medium using data transfer links. A host computer may couple to a device through a serial bus. A buffer of contiguous virtual memory addresses may correspond to non-contiguous physical addresses, which may be stored in a linked list of transfer nodes, preserving the order of the original virtual buffer elements. Each transfer node specifies a data transfer between the host and device, and may be executed by the device DMA Controller. Each node may contain source and/or destination address information, size of the data to be transferred, and a link to the next node. The transfer nodes may be transferred to the device using a double-buffering scheme wherein the device executes the nodes from one half of the link buffer while the host computer transfers further nodes to be executed to the other half of the link buffer. The buffer halves may be switched back and forth between these two processes until all links are executed. To prevent overruns, safety and message links may be inserted into the transfer link list. The safety link may prevent the DMA channel from executing the next half of the link list until it has been updated by the host. The safety link may then be turned into a connection link. The host may update the used half of the link chain only after it receives a message initiated by the message link that the DMA Channel is done with its half of the linked list.

48 Claims, 10 Drawing Sheets

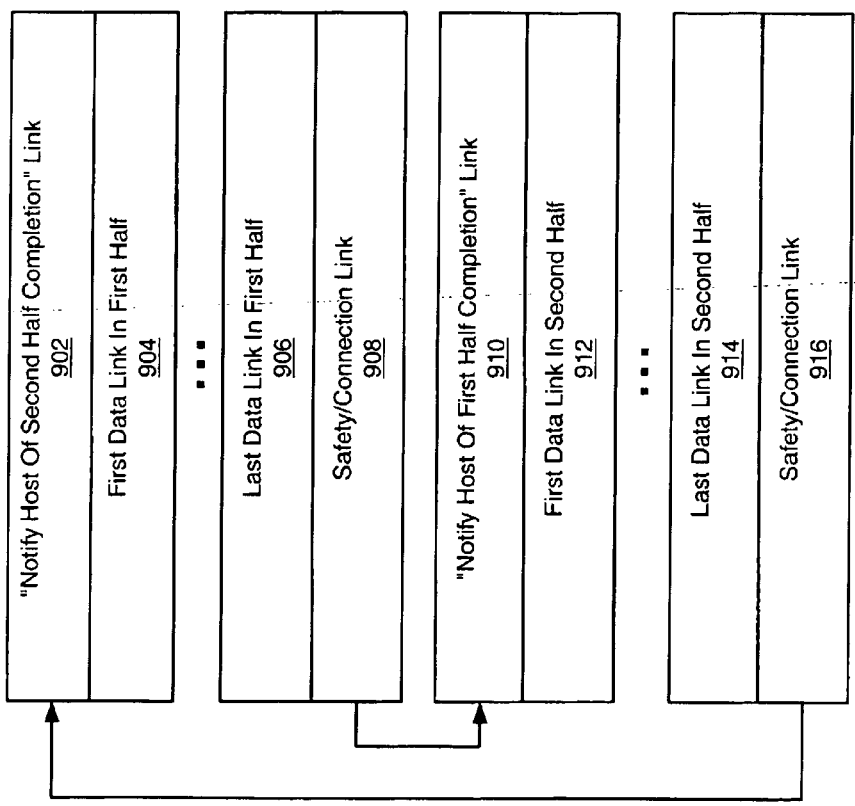

SYSTEM AND METHOD FOR TRANSFERRING DATA OVER A COMMUNICATION MEDIUM USING DATA TRANSFER LINKS

BACKGROUND OF THE INVENTION

1. Field of the Invention

This invention relates to data communications and data delivery over communication media between a host computer and a device, such as in host computer based data acquisition systems.

2. Description of the Relevant Art

In many applications it is necessary or desirable for a host computer system to communicate data with an external device. Various transmission media and protocols exist for enabling communication between a host computer system and an external device. Examples of these types of external transmission media include IEEE 1394, the Universal Serial Bus (USB), and other serial or parallel buses which enable this type of communication.

The IEEE 1394 protocol provides for Direct Memory Access (DMA). DMA is one of the most important features of the bus for data acquisition purposes since it allows a device to transfer data to/from computer memory without microprocessor intervention, thus making it very similar to the PCI bus. One potential application for the IEEE 1394 bus is remote data acquisition and test and measurement. For example, the IEEE 1394 bus may be used to connect a remote data acquisition device or measurement device to a host computer.

One problem that often arises with data transfer between a host computer and an external device is that the overhead costs related to data transfer may become so great that overall performance is substantially degraded. Each time data is transferred over the IEEE 1394 bus using an asynchronous transfer mechanism, in addition to the transmission time required for sending the data itself, a penalty (overhead) in the form of time required to acquire the bus, send the packet header and trailer, and receive an acknowledge message, will be incurred. The overhead for a IEEE 1394 non-compelled device initiated (DI) read transaction may be estimated from the following event sequence:

1) Device requests access to the IEEE 1394 bus (1 to 25 $\mu s$)
2) Bus is granted to the device
3) Device sends read request packet to the host computer
4) Host computer receives the request and acknowledges (3 to 5 $\mu s$)
5) Host processes request
6) Host computer requests the bus (1 to 25 $\mu s$)
7) Bus is granted to the host computer
8) Host transfers data to the device (1 to 41 $\mu s$)
9) Device acknowledges data receipt (3 to 5 $\mu s$)

Using the time estimates given in parentheses, a read transaction may take anywhere from 10 to 100 $\mu s$, without counting the time required for the host to retrieve data from the memory (which may take several hundred $\mu s$). The time estimate variation in steps 1) and 6) is due to possible variances in the IEEE 1394 network topology. A delay between two consecutive transactions must be long enough to allow data to arrive at all nodes on the network. The delay is determined automatically during the bus enumeration process, which in turn occurs each time a device is added to or removed from the bus. The time in step 8) depends on the packet size.

Using the given numbers, the overhead (non-data transfer time) may be estimated to be anywhere from 20% for the larger packets up to 800% for the smaller packets. If one takes into account that the overhead represents lost time that could have been used to transfer more data, sending as large packets as possible becomes a priority. For example, if an overhead of 30 $\mu s$ is incurred for each 256-byte packet ($\frac{1}{8}$ of the maximum packet size for 400 Mb/sec transfer rate), ideally, only 256 bytes of data may be transferred every 35 $\mu s$, corresponding to a transfer rate of 7 MB/s as compared to the 29 MB/s that would be achieved by using the maximum packet size (2048 bytes). A similar argument applies to DI write transactions.

Most operating systems use a concept of virtual memory to present to the user a larger memory space than the actual physical memory in the computer. As various applications access memory locations outside the computer physical memory, a block of data residing in the computer physical memory that is not currently needed gets swapped with a block from the hard disk containing the memory locations being accessed by the user. After many swaps, a contiguous buffer in the user address space may become scattered throughout the actual physical memory. This may be problematic for a direct memory access (DMA) Controller since it must access host memory using physical, not virtual addresses. A solution is a linked-list structure, referred to as a scatter-gather list, in which each page of the physical memory belonging to the user buffer is described by a node in the list. Once DMA-based data transfer is started, the DMA Controller may parse nodes in the linked list, transferring corresponding data to or from the corresponding memory locations.

The use of a scatter-gather list may cause additional overhead when used with external devices. For example, using 4 KB as a typical OS page size, the time estimates for a IEEE 1394 transaction given above, and the fact that larger packets offer better bus bandwidth utilization, one can calculate that in the worst case after every 200 $\mu s$ spent on data transfer (two maximum size packets), the device may spend an additional 60 $\mu s$ fetching the next link in the scatter-gather list from the host memory: a 23% overhead. In the calculation, time spent in step 8 of the 1394 transaction that reads the scatter-gather has been approximated as 0. The overhead may reach 33% for low-level hardware bus bridges that are optimized for transfer of large amounts of data. Such devices may read an entire packet worth of data from the host memory, consume only a small portion containing a single link worth of information, and discard the rest because it may not be possible to determine whether the device is fetching data or data transfer links.

Because of the problems presented above, new and improved systems and methods are desired for transferring data between a host and a device over an external communication medium.

SUMMARY OF THE INVENTION

The present invention comprises various embodiments of a system and method for transferring data over a communications medium using data transfer links. A host may be coupled to a device, such as an instrument, which may be further coupled to a sensor. The instrument may be a data acquisition (DAQ) device, which combined with the sensor, may be operable to collect data concerning pressure, temperature, chemical content, current, resistance, voltage, audio or image data, or any other detectable attribute. The host may be operable to control the instrument by sending requests to read from or write to the instrument's memory registers. The host may be further operable to obtain data from the instrument for storage and analysis on the host computer system. In one embodiment, the host may comprise a computer system which is coupled to an instrument through a serial bus, such as an IEEE 1394 bus, as described in an IEEE 1394 protocol specification.

As discussed earlier, a buffer of contiguous virtual memory addresses may correspond to addresses in physical memory which may not be contiguous. These physical addresses may be stored in a linked list of transfer nodes which preserves the order of the original virtual buffer elements. Each transfer link node may specify a data transfer between the host computer and the data acquisition device, and may be executed by the device DMA Controller. Thus, when a user issues commands relating to a sequence of virtual memory addresses, the 'virtual' order of the memory addresses may be preserved in the linked list, even though the actual physical memory addresses affected may be non-contiguous and in a completely different order. Each link node may contain source and/or destination address information, the size of the data block to be transferred, and a link to a subsequent link node.

According to one embodiment of the invention, the data acquisition device may first be configured for a data input/output (I/O) operation. In one embodiment, the data I/O operation may be a data acquisition process, wherein the device receives data from a sensor and stores the data in a data buffer, and the device transfers the data from the data buffer to the memory of the host computer. In another embodiment, the data I/O operation may be a data generation process, wherein the device transfers data from the host memory to the device buffer and then uses the data in the buffer to generate a signal, such as a sine wave. In one embodiment, the configuration of the device for the data I/O operation may be performed by the host computer system.

The device may include a link buffer for storing transfer links. The host computer may prepare a plurality of transfer links, each of which specifies a transfer of data between the device and the host computer. The host computer may then transfer the transfer links to the link buffer of the device through the communication medium. This is referred to as a "push operation", in that the host computer "pushes" the links over to the device. In another embodiment, the device may fetch the links from the host computer, referred to as a "pull operation", because the receiver of the transfer (the device) "pulls" the links from the host computer. The host computer may then initiate the data I/O operation on the device. The DMA Controller executes transfer links from the link buffer, and transfers data between the device and the host computer.

If the data I/O operation is a data acquisition process, the device may acquire data from a sensor and store it in the data buffer. The device may then notify the DMA Controller that the data is ready to send. Finally, the DMA Controller may begin executing the transfer links from the link buffer to transfer the data from the data buffer to the memory of the host computer.

If the data I/O operation is a data generation process, the device may request the data from the DMA Controller, such as the signal information described above. The DMA Controller may then begin executing the links from the link buffer to transfer the data from the host computer to the data buffer.

In a preferred embodiment of the invention, the link buffer is double buffered. Thus the device executes the transfer links from a first portion of the link buffer while the host computer transfers further links to be executed to a second portion of the link buffer of the acquisition device, thereby implementing a double buffering scheme for link transferal. The host computer first transfers links from host memory, filling the link buffer of the device. In a preferred embodiment, the link buffer may be divided into two portions, e.g., halves, to facilitate the double buffering scheme. The device executes the transfer links in the first (current) half of the link buffer. The current buffer half is then switched to the second buffer half, i.e., the device then begins executing links from the second buffer half. Meanwhile, the host computer transfers links from the host computer memory to the other buffer half, i.e., the first buffer half, while the device is executing links from the second buffer half. The device executes each transfer link of the current buffer half, until the last link in the current buffer half is reached. When the last link of the current buffer half is reached, then the current buffer half is switched, and the process continues as before, but with the buffer halves switched. The buffer halves may be switched back and forth between these two processes until all the links are executed.

To aid in the double buffering process, special self configuration links may be inserted into the transfer link list to provide special instructions to the DMA Controller. A self configuration (SCFG) link may contain one or more instructions used to access various registers in the DMA Controller.

Once the device executes the link nodes in one half of the list, it may notify the host via a message link. The message link may be a SCFG link that contains instruction that may cause the DMA Controller to request host attention. The host may then update the executed nodes while the device is parsing nodes from the second half of the list. To prevent overruns, a safety link may be inserted at the end of the linked list in each buffer half. The safety link may be a SCFG link that contains instructions to STOP or PAUSE the DMA Channel In the preferred embodiment, if the DMA channel reaches the safety link before the next half of the link chain has been updated by the host, the safety link may stop the DMA channel. It should be noted that this may potentially cause data overflows/underflows on the device DAQ HW. In another embodiment the safety link may pause the DMA channel and let it continue after the host has completed its update. Once the host updates the used half of the linked list, it may turn the safety link into a connection link allowing the DMA channel to continue without interruptions.

BRIEF DESCRIPTION OF THE DRAWINGS

Other advantages and details of the invention will become apparent upon reading the following detailed description and upon reference to the accompanying drawings in which:

FIG. 9 is an illustration of safety and message link nodes, according to one embodiment.

Figure 1:
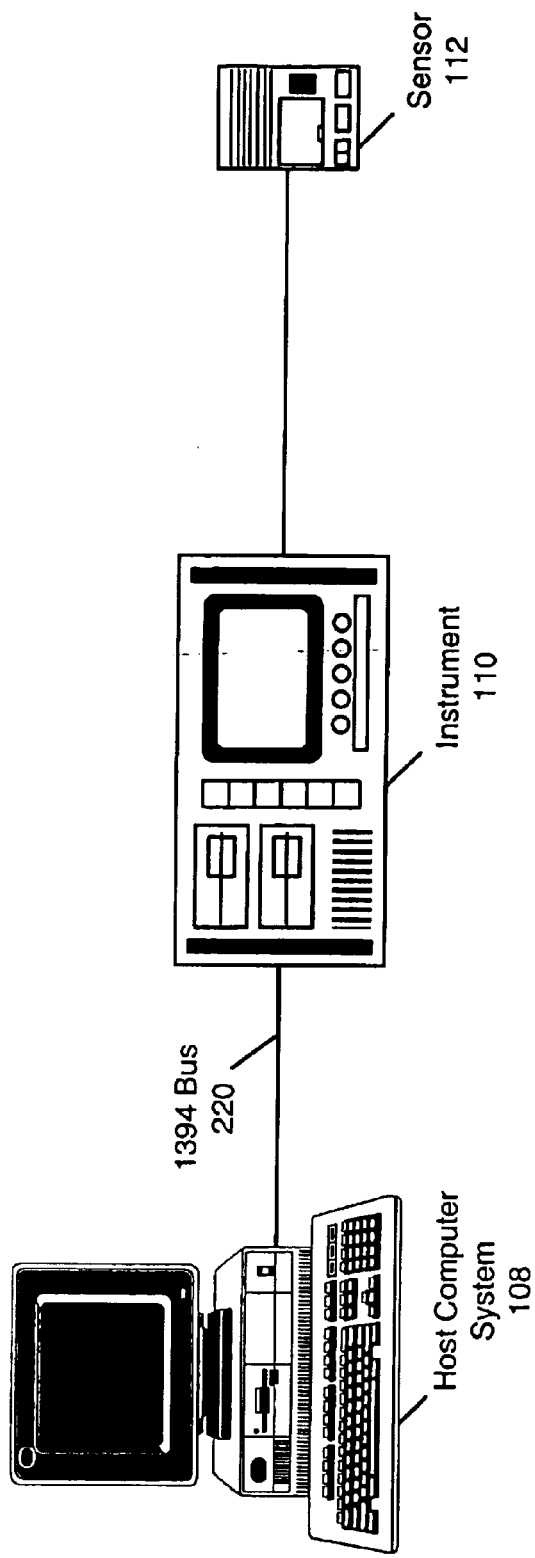
FIG. 1 is an illustration of a data acquisition system, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

U.S. Pat. No. 5,875,313 titled "PCI Bus to IEEE 1394 Bus Translator Employing Write Pipe-Lining and Sequential Write Combining", whose inventors are Glen O. Sescila III, Brian K. Odom, and Kevin L. Schultz, and which issued on Feb. 23, 1999, is hereby incorporated by reference in its entirety as though fully and completely set forth herein.

U.S. Pat. No. 5,659,749 titled "System and Method for Performing Efficient Hardware Context Switching in an Instrumentation System", whose inventors are Brian K. Odom, and Bob Mitchell, and which issued on Aug. 19, 1997, is hereby incorporated by reference in its entirety as though fully and completely set forth herein.

U.S. Pat. No. 5,659,749 titled "System and Method for Performing More Efficient Window Context Switching in an Instrumentation System", whose inventors are Hugo Andrade and Brian K. Odom, and which issued on Dec. 12, 1997, is hereby incorporated by reference in its entirety as though fully and completely set forth herein.

FIG. 1-A Data Acquisition System

FIG. 1 illustrates a system according to one embodiment. It is noted that the present invention may be used in various types of systems where a host computer communicates with an external device. Exemplary systems include test and measurement systems, industrial automation systems, process control systems, robotics systems and other types of systems. In the preferred embodiment described below, the device is a data acquisition (DAQ) device, and the system is a computer-based DAQ system.

As FIG. 1 shows, a host computer system 108 is coupled through a communication medium 220 to a data acquisition device or instrument 110 which is further coupled to a sensor 112. In a preferred embodiment, the bus 220 may be an IEEE 1394 bus, such as described in the current or future IEEE 1394 protocol specifications, although in other embodiments the bus may implement other protocols such as Ethernet, USB, TCP/IP, or any other serial or parallel communication protocol. The following describes one embodiment of the present invention which uses the MME 1394 bus, although it is noted that the invention may be used with any of various communication media.

The sensor 112 may be any type of transducer which is operable to detect environmental conditions and send sensor data to the instrument 110. The instrument 110 may be a data acquisition (DAQ) device, which combined with the sensor 112, may be operable to collect data concerning pressure, temperature, chemical content, current, resistance, voltage, audio or image data, or any other detectable attribute. for example, the DAQ system may be an image acquisition system or a machine vision system. The instrument or DAQ device 110 may also include data generation capabilities. The host computer system 108 may be operable to control the instrument 110 by sending requests to read from or write to the instrument's memory registers. The host computer system 108 may be further operable to obtain data from the instrument 110 for storage and analysis on the host computer system 108, either by issuing read requests or by programming the instrument 110 to send data to the memory of the host computer 108.

The host computer 108 preferably includes a memory medium on which computer programs of the present invention are stored. The host computer executes instructions from the memory medium to handle device retry requests on the communication medium 220. The memory medium may include a software architecture similar to that shown in FIG. 4.

Figure 2A:
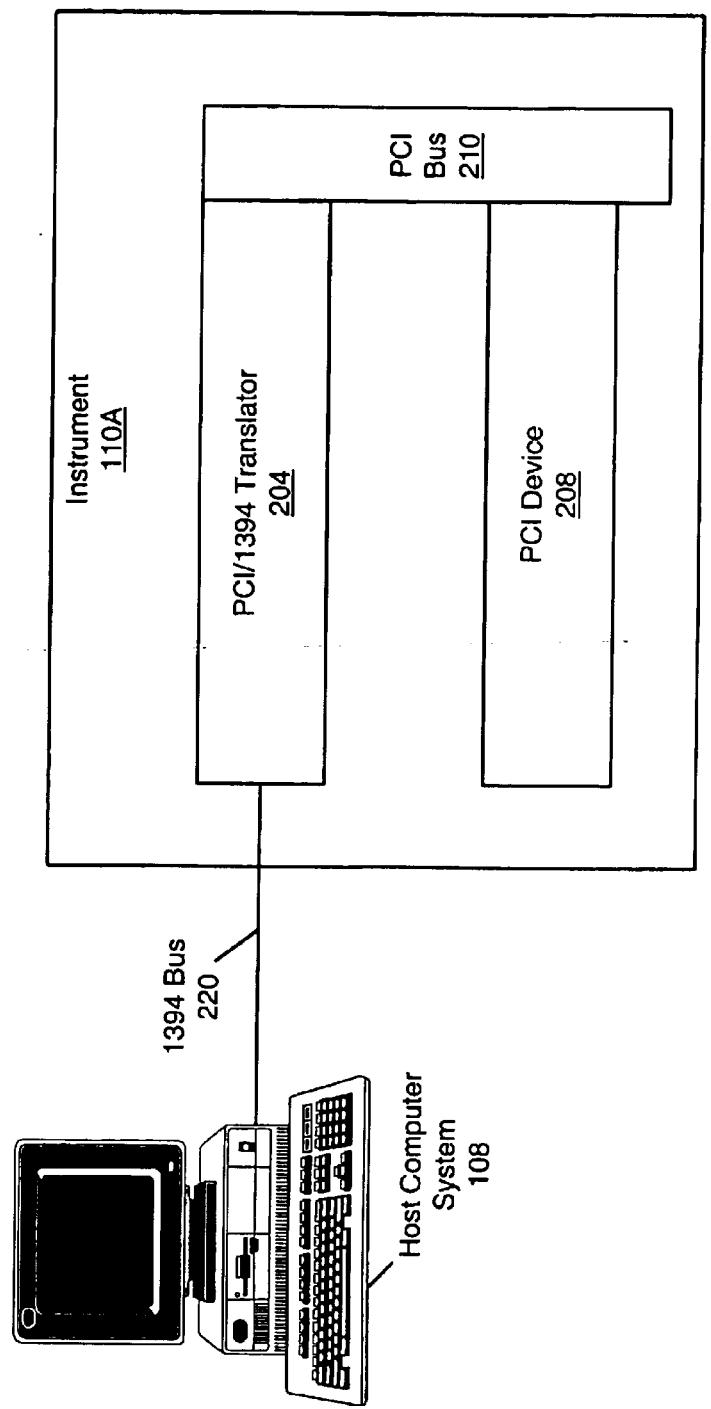
FIG. 2A is an illustration of a 1394/PCI data acquisition system, according to one embodiment.

FIG. 2A: A 1394/PCI Data Acquisition System

FIG. 2A illustrates one embodiment of the data acquisition system 110. As shown in FIG. 2A, host computer system 108 is coupled to a PCI instrument 110A through serial bus 220, such as an IEEE 1394 bus.

In one embodiment, as shown in FIG. 2A, the instrument 110A may include a PCI device 208 which is coupled to a PCI/1394 translator 204 (also referred to as a PCI/1394 Interface) through a PCI bus 210. In one embodiment, the translator 204 may include a National Instruments FirePHLI™, which provides translation between the IEEE 1394 protocol and PCI, and error management, described below with reference to FIG. 5. The host computer system 108 may be operable to communicate with the PCI device 208 through the IEEE 1394 bus 220 via the 1394/PCI translator 204. The 1394/PCI translator 204 may be operable to translate between the IEEE 1394 and PCI address spaces, allowing the host computer system 108 to send IEEE 1394 requests to and receive IEEE 1394 responses from the PCI device 208. The 1394/PCI translator thus allows existing PCI devices to be used in an IEEE 1394 system. For more information on the 1394/PCI translator 204, please see U.S. Pat. No. 5,875,313 titled "PCI Bus to IEEE 1394 Bus Translator Employing Write Pipe-Lining and Sequential Write Combining", which was incorporated by reference above. In an alternate embodiment, the instrument 110 may be an IEEE 1394 instrument, and thus the PCI/1394 translator 204 is not necessary.

Figure 2B:
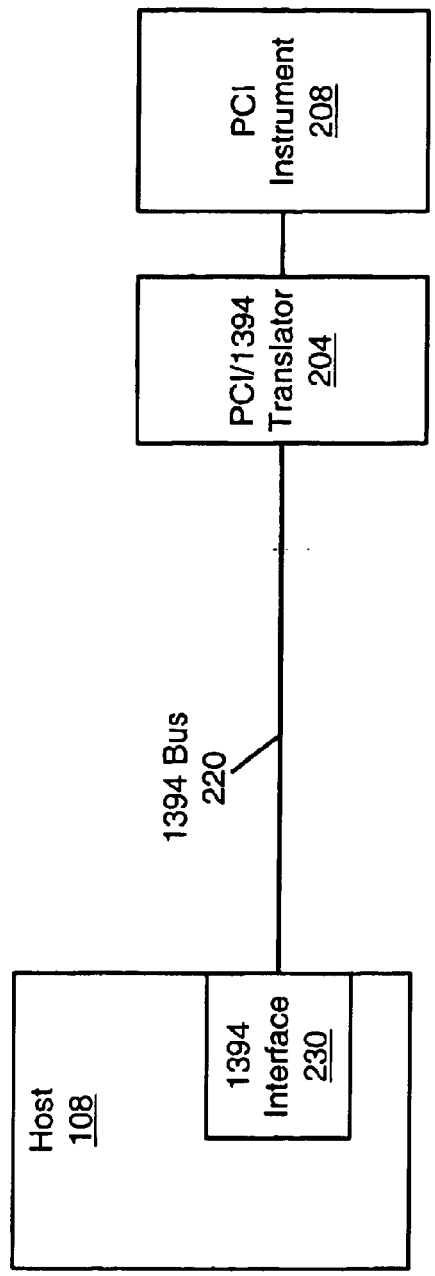
FIG. 2B is a block diagram of a 1394/PCI data acquisition system, according to one embodiment.

FIG. 2B: A 1394/PCI Data Acquisition System

FIG. 2B is a block diagram of the data acquisition system of FIG. 2A, according to one embodiment. As FIG. 2B shows, host 108 is communicatively coupled to PCI instrument 208 through IE 1394 bus 220 and 1394/PCI translator 204, described above with reference to FIG. 2A. Host 108 is connected to the IEEE 1394 bus 220 via a IEEE 1394 interface 230.

Figure 3:
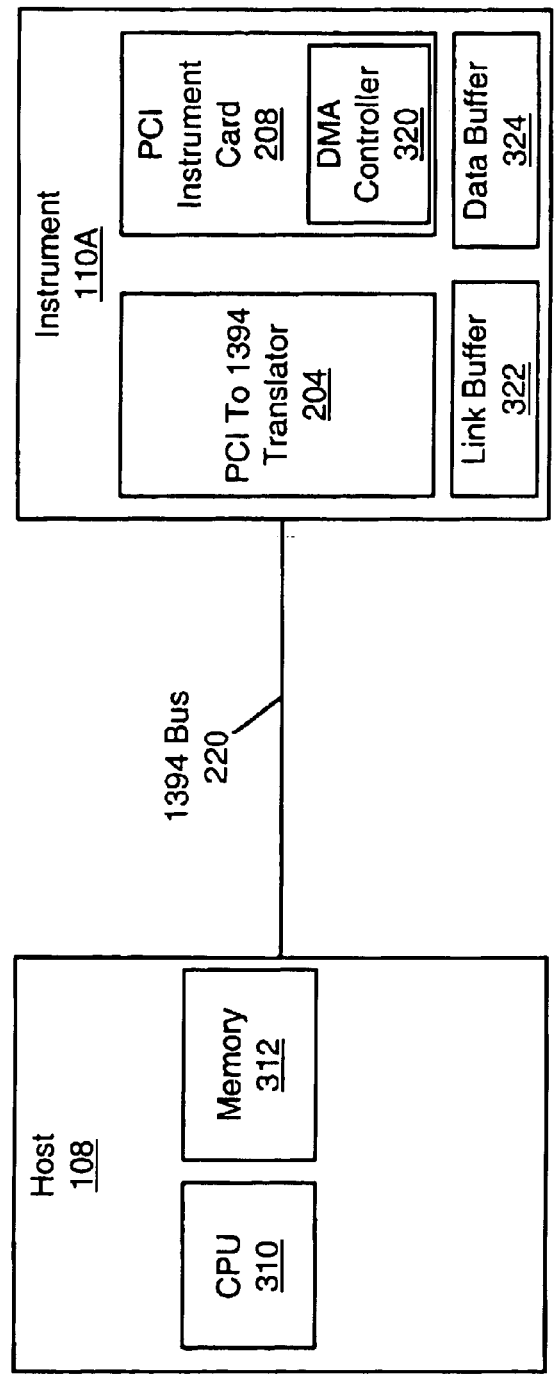
FIG. 3 is a block diagram of a 1394 data acquisition system, according to one embodiment.

FIG. 3: A 1394 Data Acquisition System

FIG. 3A is a block diagram of a IEEE 1394 data acquisition system, according to one embodiment. As shown in FIG. 3, the host 108 is communicatively coupled to a IEEE 13942-compliant instrument 110A through IEEE 1394 bus 220. The host 108 includes a CPU 310, and a memory 312 which is operable to store programs and data. In one embodiment the instrument 110A is configured with a PCI instrument card 208 which is operable to accept and manage sensor data, and which includes a Direct Memory Access (DMA) Controller 320. The instrument 110A also includes a 1394/PCI bridge or translator 204, such as a National Instruments FirePHLI™, which may provide translation between the IEEE 1394 protocol and PCI, and is described in more detail below. Finally, as can be seen in FIG. 3, the instrument 110A may also include a link buffer 322 which may be coupled to the DMA Controller 320 and the 1394/PCI translator 204, and which may be operable to store transfer information from the host 108, as well as a data buffer 324, which may be coupled to the DMA Controller, and which may be operable to store data transferred from the host computer, or data slated for transfer to the host computer, such as data acquired form a sensor. The DMA Controller may use transfer information from the link buffer 322 to transfer data between the memory of the host computer system and the data buffer 324.

1394/PCI Translator Functionality

In each of the embodiments where the 1394/PCI Translator (e.g., the FirePHLI™) is used the 1394/PCI Translator chip preferably provides the following functionality:

a) Translates register Read/Write packets into a PCI Read/Write operations.
b) Segments device's PCI address space into two pieces. The lower 2 GB can be mapped into address space of any other IEEE 1394 node on the bus, whereas the upper 2 GB are mapped into a local memory space of the remote device. When referring to memory and the PCI bus, the terms "local" and "device's" will be used interchangeably. Note also that as used herein, the IEEE 1394 node into which the lower 2 GB address space is mapped will be referred to as the host because in exemplary embodiments of the invention DAQ devices are used to write into or read from the host computer memory.
c) Translates interrupt cycles on the local PCI bus into IEEE 1394 packets. These packets can than cause interrupts on the destination node.
d) Fetches data from the host in response to a local PCI read operation targeted at the host's address space. Since each device initiated (DI) read transaction can take anywhere from a few micro-seconds to a few hundred micro-seconds, sequential host memory accesses are optimized through buffering: each time a host memory read is issued, the FirePHLI reads not only the requested number of bytes (sizeOfRead), but also an additional N minus sizeOfRead bytes from the sequential addresses. Thus the FirePHLI essentially performs a read pre-fetching operation to request additional data each time a read occurs. The value of N can be programmed to any integer value divisible by 4 between four and the maximum packet size for the corresponding transfer speed. For example, if N=512, the sizeOfRead is 4, and read is issued from address 0x1000, the FirePHLI will prefetch bytes on addresses 0x1000 through 0x1000+N=0x11FF into its read buffers and return data located at 0x1000 to 0x1003 to the issuer (the 0x prefix denotes hexadecimal numbers). If the next local read is issued from the sequential address (0x1004 in this example) and is of the same size, the FirePHLI will not re-read data from the host. Instead, it will read data from its buffer, thus removing overhead of a IEEE 1394 transaction. On the other hand, if the next read is issued from a non-sequential address, for example 0x1100, the read is considered out-of-order and the FirePHLI will prefetch new data from locations 0x1100 to 0x12FF. The same will happen if the new read is of a different size.

Each time a new block of data is read from the host memory, all unused data located in the buffer the new data is being prefetched into is flushed. To minimize the flushing of the unused data from the read buffers, the FirePHLI has multiple dedicated read buffers: the new data will be stored into an empty buffer, or, if no empty buffers are available, into the buffer whose data has been least recently prefetched.

e) Sends data to the host memory when a write operation into the host memory is performed on the local PCI bus. Since each DI write transaction can take anywhere from a few micro-seconds to a few hundred micro-seconds, creating a packet for each write is expensive and causes large overhead on the bus (for each 1–4 bytes of data transferred, another 16–24 bytes are used for packet headers, CRC codes, etc.). For that reason, the FirePHLI has multiple dedicated write buffers that are used to store in-order write data. Each time a write to the host address space is issued, the FirePHLI compares the current and the previous destination addresses and sizes. If the transfer sizes are equal, and the difference between the current and the previous destination address is equal to the transfer size, the new data is simply appended to the corresponding write buffer. If not, the least recently accessed write buffer whose data has been sent to the host is used to store the new information. If all buffers still contain unsent data and the new data can not be appended to any of them because the local PCI write does not adhere to the given rules or the correct buffer is full, a retry is issued on the local PCI bus. The write buffers are flushed in the first accessed fashion each time the FirePHLI is granted access to the IEEE 1394 bus.

If a low speed data acquisition is running on a device, it is possible that the IEEE 1394 bus will be granted fast enough so that any data pending in the FirePHLI write buffers will be flushed before new data is generate by the DAQ HW. In that case, the packets going over the wire will cause large overhead. However, since the bus has been granted, this means that no other device is using the bus and the overhead is not a problem. On the other hand, if the IEEE 1394 bus is very busy, the bus will be granted to the device only sporadically, and the advantage of the FirePHLI buffering scheme becomes apparent. In effect, the size of the FirePHLI buffers may be added to the size of the device input FIFOs.

Figure 4:
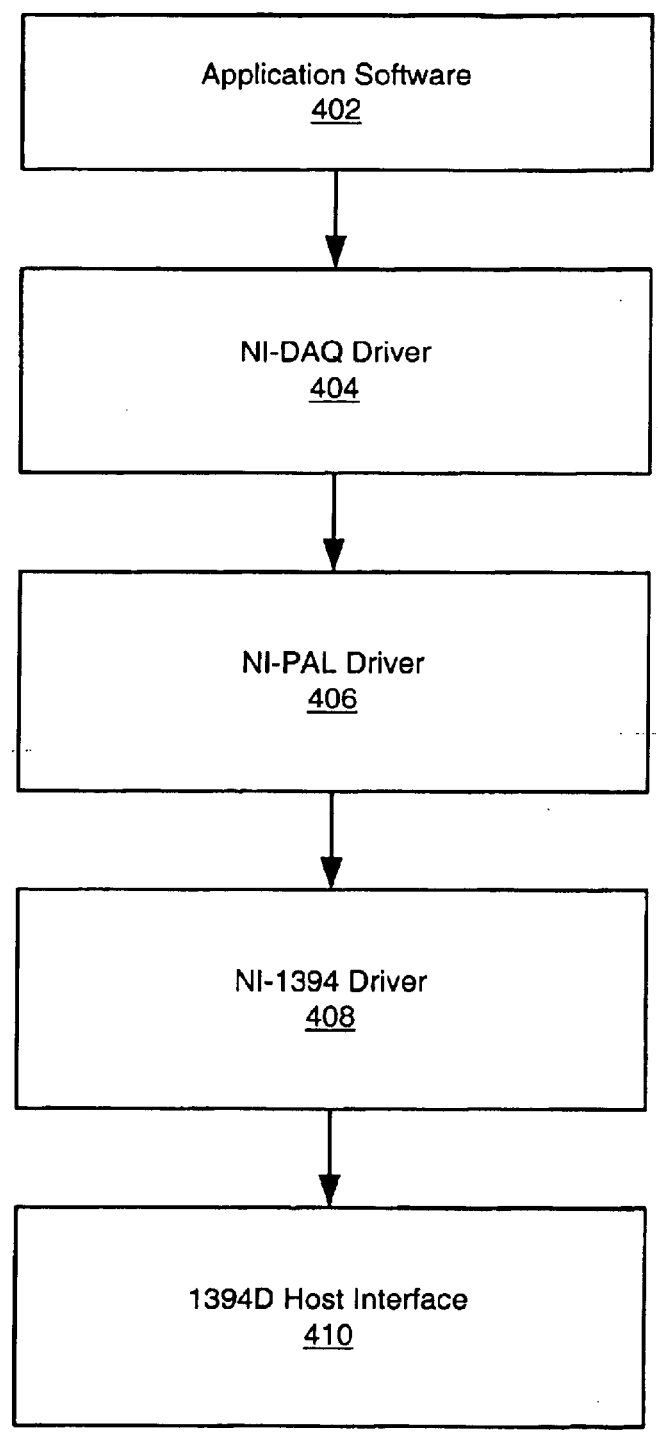
FIG. 4 is a block diagram of the host software architecture of the system, according to one embodiment.

FIG. 4: Software Architecture

FIG. 4 is a block diagram of the software architecture of the system, according to one embodiment. As FIG. 4 shows, the top layer of the software architecture is application software 402. The application software 402 may be any software program which is operable to provide an interface for control and/or display of a data acquisition (DAQ) process. In one embodiment, the software application 402 may include a program developed in National Instrument's LabVIEW™ or LabWindows/CVI development environments. A driver program 404 may be below the application software 402. The driver 404 may be a DAQ driver 404, such as National Instrument's NI-DAQ driver program. The next software layer may optionally be a platform abstraction layer (PAL) driver 406, such as National Instrument's NI-PAL driver program. The PAL 406 may operate to abstract the internal communication bus and operating system to a common API. A IEEE 1394 platform abstraction layer firewire (PAL-FW) IEEE 1394 driver 408, such as National Instrument's NI-PAL F/W driver program, may be below the NI-PAL driver 406. This software preferably manages the data transmission process using transfer objects according to one embodiment of the present invention, described below with reference to FIGS. 5–8. A 1394D host interface 410 is below the NI-PAL F/W driver 408, such as provided by Microsoft Corporation, which abstracts the driver layer. The 1394D host interface 410 provides an interface to IEEE 1394 chipset driver software, such as OHCI 1394 driver software, which interfaces with the relevant hardware; i.e., the IEEE 1394 interface hardware.

Figure 5:
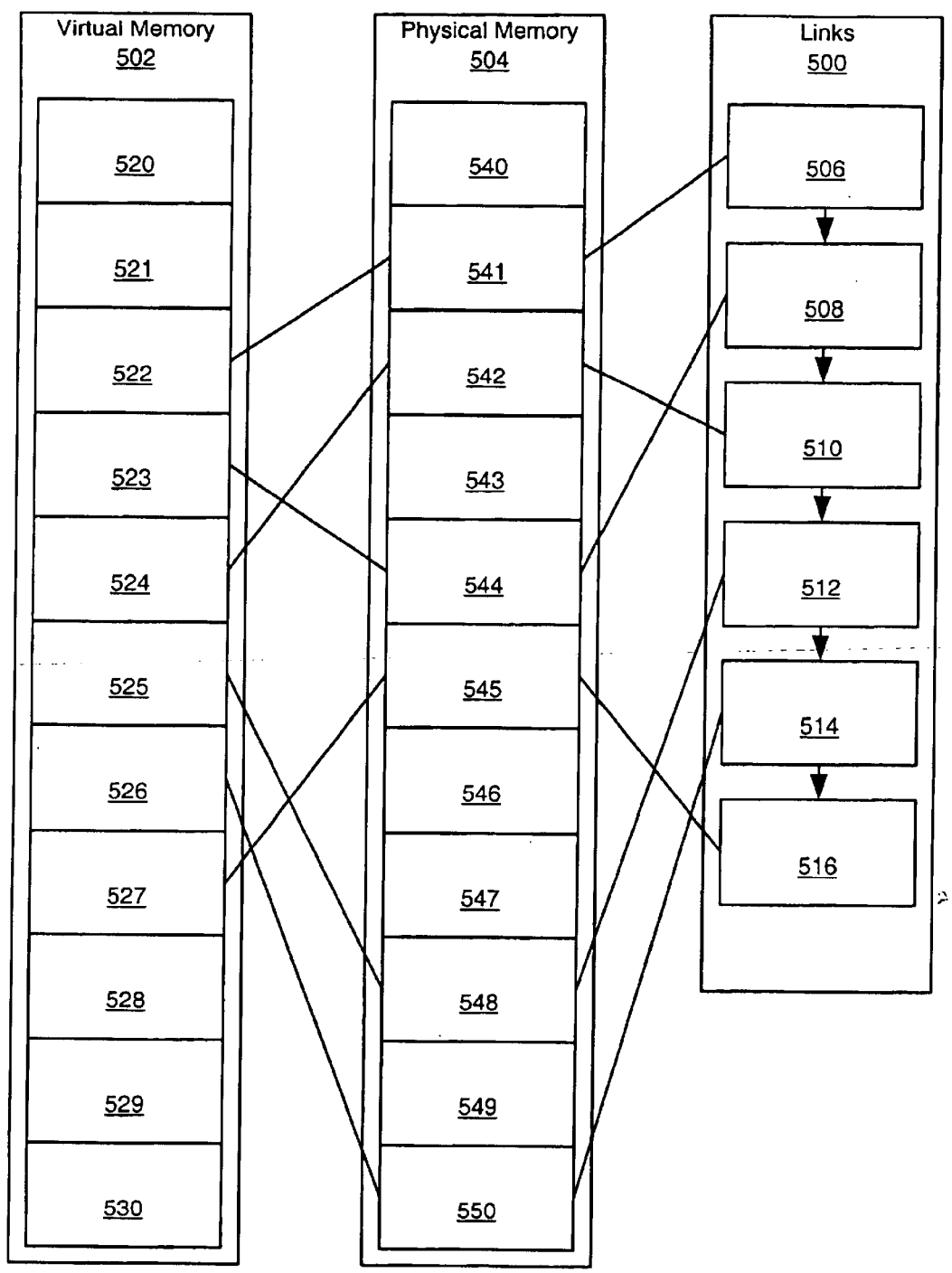
FIG. 5 is an illustration of transfer links, according to one embodiment.

FIG. 5: Virtual Memory, Physical Memory, and Transfer Links

Most operating systems use a concept of virtual memory to present to the user a larger memory space than the actual physical memory in the computer. Virtual memory locations that do not fit into the computer physical memory are stored on a hard disk. As various applications access memory locations outside the computer memory, a block of data residing in the computer memory that is not needed at the moment gets swapped with a block from the disk containing the memory locations being accessed by the user. The block of data is referred to as a page and can be of various sizes. However, 4 KB is the page size found on many desktop operating systems. As many swaps occur, a contiguous buffer in the user address space may become scattered throughout the actual physical memory. This represents a challenge for any direct memory access (DMA) controller since it must access host memory using physical and not virtual addresses (note that the user buffer in the virtual memory spans contiguous addresses). The solution presented by one embodiment of the present invention is a linked-list structure in which each page of the true physical memory belonging to the user buffer is described by a node in the list. Note that in some cases more than one page can be described by a single link if the pages are contiguous in the physical memory as well. The overhead associated with link transferal may be mitigated through the use of a remote heap, or link buffer, on the device side for storing transfer links. Once DMA-based data transfer is started, the DMA Controller may parse nodes in the linked list and transfer corresponding chunks of data to or from the corresponding memory locations. As used herein, the term 'memory location' will imply an address in the physical memory space of the computer.

FIG. 5 is a diagram of the relationship between virtual memory, physical memory, and transfer links, according to one embodiment. As FIG. 5 shows, virtual memory 502 comprises memory addresses 520–530, and physical memory 504 comprises addresses 540–550. It should be noted that these figures are for illustration purposes only, actual memory architecture may differ substantially. As indicated in FIG. 5, virtual memory addresses 522–527 comprise a buffer of contiguous virtual memory addresses. These addresses correspond to addresses in physical memory 504 which may not be contiguous. Specifically, the virtual buffer address correspond to the physical memory address sequence 541, 544, 542, 548, 550, and 545. These physical addresses are, in turn, stored in a linked list of transfer nodes 500 which preserves the order of the original virtual buffer elements. Each transfer node may specify a data transfer between a host computer and a data acquisition device, and may be executed by the device DMA Controller. Thus, when a user issues commands relating to a sequence of virtual memory addresses, the 'virtual' order of the memory addresses is preserved in the linked list, even though the actual physical memory addresses affected may be non-contiguous and in a completely different order. The structure of transfer nodes is described in more detail below with reference to FIGS. 6 and 10 below.

Figure 6:
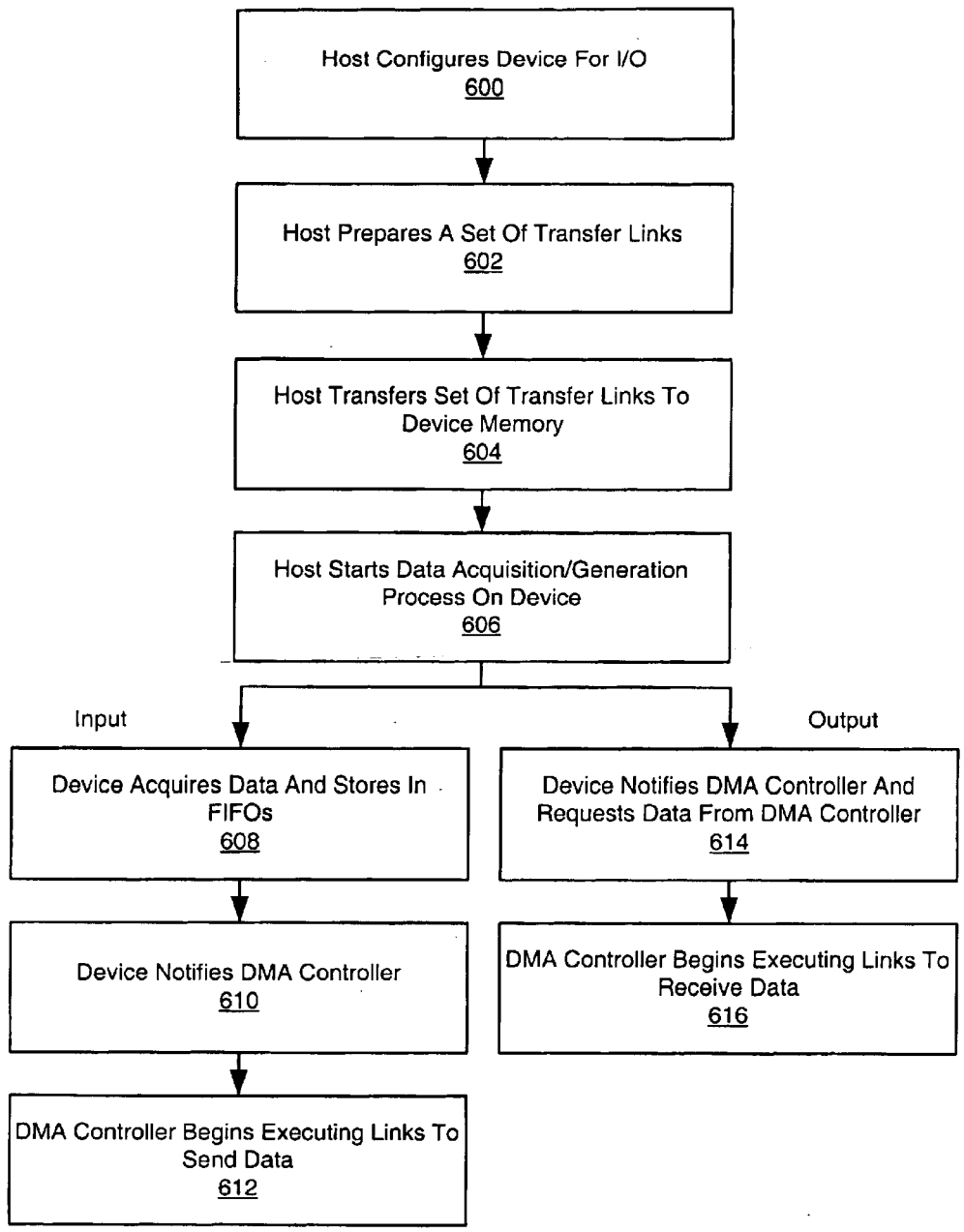
FIG. 6 is a flowchart of a partial scatter/gather process, according to one embodiment.

FIG. 6: A Partial Scatter/Gather Process

FIG. 6 is a flowchart of a partial scatter/gather process, according to one embodiment. As FIG. 6 shows, in 600 a data acquisition device 110 is configured for a data input/output (I/O) operation. In one embodiment, the data I/O operation may be a data acquisition process, where the data acquisition device 110 has received data from a sensor 112 and stored the data in the data buffer 324, and the data acquisition device 110 transfers the data from the data buffer 324 to the memory 312 of the host computer 108. In another embodiment, the data I/O operation may be a data generation process, where the host computer 108 may send instructions to the data acquisition device 110 to generate a signal, such as a sine wave signal. Such instructions may include signal information such as frequency, amplitude, or waveform information. In one embodiment, the waveform information may include digital samples of the signal waveform. In one embodiment, the host computer system 108 may configure the data acquisition device 110 for the data I/O operation.

The data acquisition device 110 may also include a link buffer 322 for storing transfer links. In 602, the host computer 108 may prepare a plurality of transfer links, where each of the plurality of transfer links specifies a transfer of data between the data acquisition device 110 and the host computer 108. In 604, the host computer 108 transfers the plurality of transfer links to the link buffer 322 of the data acquisition device 110 through the communication medium 220. This is referred to as a "push operation", in that the host computer 108 "pushes" the links over to the device 110. In another embodiment, the device 110 may fetch the links from the host computer 108, referred to as a "pull operation", because the receiver of the transfer (the device 110) "pulls" the links from the host computer 108.

Then, in 606, the data acquisition device 110 may initiate the data I/O operation. In a preferred embodiment, the host computer 108 may initiate the data I/O operation on the data acquisition device 110. In one embodiment, the data acquisition device 110 may include a DMA Controller which is operable to execute transfer links from the link buffer 322, and transfer data between the data acquisition device 110 and the host computer 108.

If the data I/O operation is a data acquisition process, then in 608, the data acquisition device 110 acquires data from a sensor 112 and stores it in the data buffer 324. In one embodiment, the data may be stored in FIFO (first in-first out) data structures. The device 110 may then notify the DMA Controller 320 that the data is ready to send, as indicated in 610. Finally, in 612, the DMA Controller 320 begins executing the transfer links from the link buffer to transfer the data from the data buffer 324 to the memory 312 of the host computer 108.

If the data I/O operation is a data generation process, then in 614 the device 110 may notify the DMA Controller 320 and request data from the DMA Controller 320, such as the signal information described above. Then, in 616, the DMA Controller 320 begins executing the transfer links from the link buffer to receive the data from the host computer 108, thereby transferring data from the memory 312 of the host computer 108 to the data buffer 324 of the data acquisition device 110. A more detailed description of the link transfer/execution process is given below with reference to FIG. 7.

Figure 7:
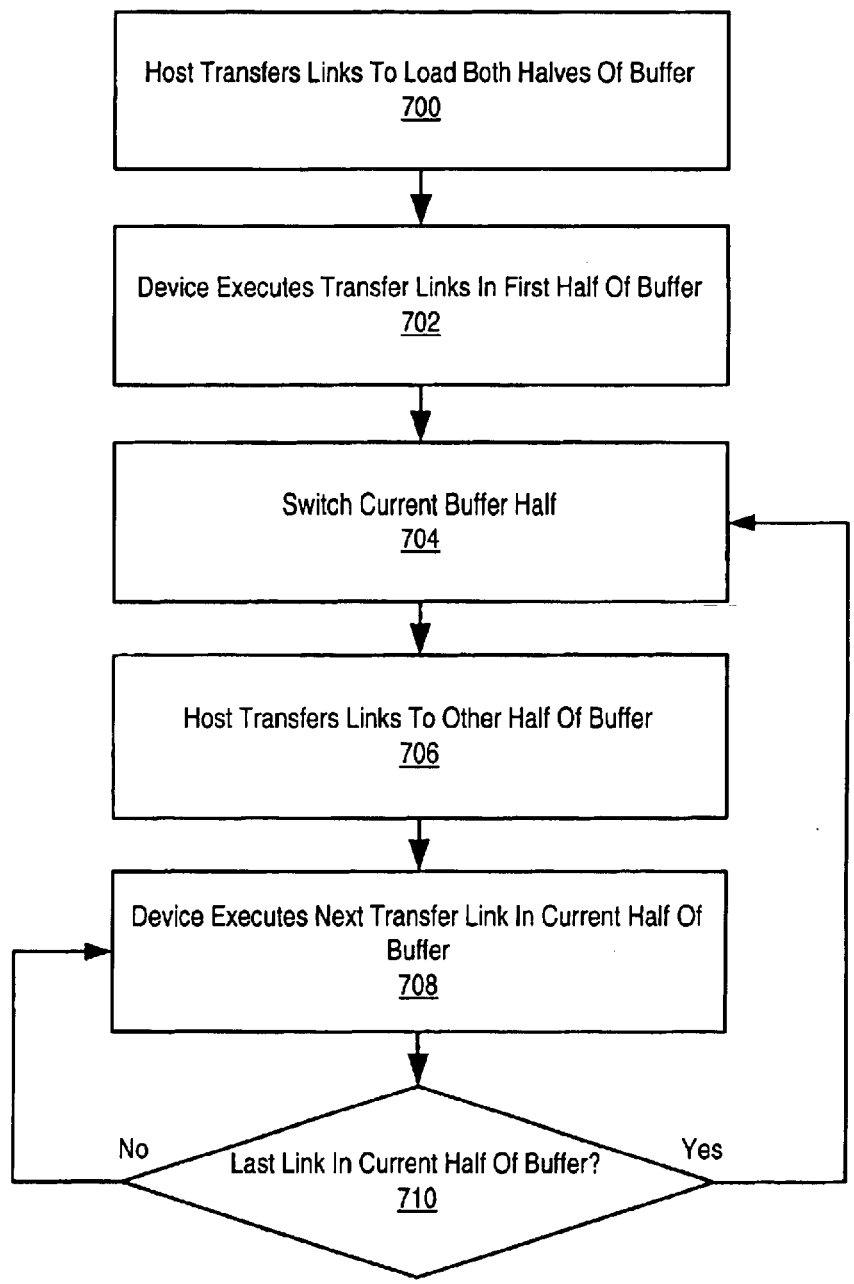
FIG. 7 is a flowchart of transfer link double buffering, according to one embodiment.
Figure 8:
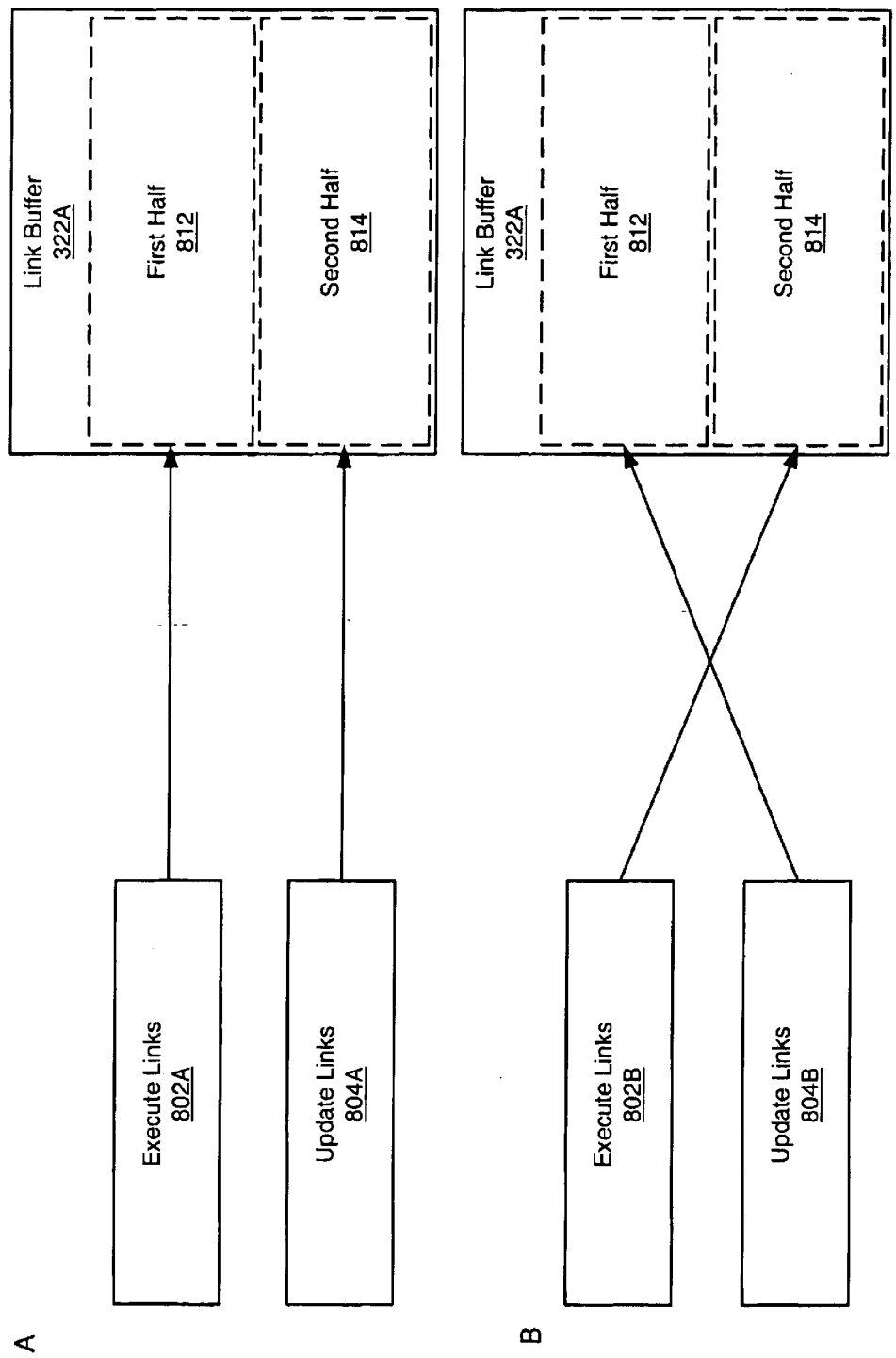
FIG. 8 is an illustration of transfer link double buffering, according to one embodiment.

FIGS. 7 and 8: The Data Transfer Process

FIG. 7 is a flowchart of a data transfer process, according to one embodiment. In one embodiment, the link buffer 322 on the device 110 may be large enough to store the entire list of transfer links, in which case the transfer links may be transferred to the device 110 and stored in the link buffer 322 entirely. However, in many cases, the link buffer 322 on the device 110 may not be large enough to store the entire list of transfer links at one time. Therefore, in a preferred embodiment of the invention, the data acquisition device 110 executes the transfer links from the link buffer 322 to transfer data between the data buffer 324 in the data acquisition device 110 and host memory 312 in the host computer system 108 while the host computer 108 transfers further links to be executed to the link buffer 322 of the acquisition device 110, thereby implementing a double buffering scheme for link transferal. FIG. 8 is a diagram illustrating the double buffering of the link transfer/execution process, and is used to help explain the flowchart of FIG. 7. It should be noted that in various embodiments, some of the steps presented in FIG. 7 may be executed concurrently, or in a different order than presented.

As shown in FIG. 7, the host computer 108 first transfers links from host memory 312 to the link buffer 322 of the data acquisition device 110, filling the link buffer 322. In a preferred embodiment, the link buffer 322 is divided into two halves to facilitate the double buffering scheme, although different proportions of division may be used. Such a division of the link buffer 322A is shown in FIG. 8, where the link buffer 322A is divided into a first half 812 and a second half 814.

In 702, the device 110 executes the transfer links in the first (current) half 812 of the link buffer 322. The current buffer half is then switched (to buffer half 814), as indicated by 704. Then, in 706, the host computer 108 transfers links from the host computer memory 312 to the other buffer half, i.e., the first buffer half 812. In one embodiment, the links are transferred while the device 110 is executing the links of the second buffer half 814. In 708, the device 110 executes the next transfer link of the current buffer half 814, and in 710, a determination is made whether the link is the last link in the current buffer half 814. If so, then the current buffer half is switched, as indicated by 704, and the process continues as before, but with the buffer halves switched. If, on the other hand, the link is not the last link in the current buffer half, then the device 110 executes the next transfer link in the current buffer half, as indicated by 708, and continues to do so until the last link is reached.

As FIG. 8 illustrates in A, the DMA Controller of the data acquisition device may execute transfer links 802A in the first buffer half 812, while the host computer 108 is updating (transferring) links 804A to the second buffer half 814. Similarly, in FIG. 8 B, it may be seen that the host computer 108 may update links 804B in the first buffer half 812 while the DMA Controller executes links 802B in the second buffer half 814. The buffer halves may be switched back and forth between these two processes until all the links are executed. To aid in the double buffering process, special self configuration or safety links may be inserted into the transfer link list to provide special instructions to the DMA Controller.

FIG. 9: Safety and Message Links

In addition to data transfer links, the link buffer may also contain self-configuration (SCFG) links. FIG. 9 illustrates a self-configuration link, according to one embodiment. Each SCFG link may contain one or more instructions used to access DMA Channel register.

If one of the instructions is a STOP or PAUSE DMA Channel instruction, the SCFG link becomes a safety link. If one of the instructions will case DMA Channel to request attention from the host, the SCFG link becomes a message link. One way of using safety and message links is shown in FIG. 9.

As described above, once the data acquisition device executes the link nodes in one half of the list as indicated by 904–906 or 912–914, it notifies the host via message link (902/910). The host then updates the executed nodes while the device is parsing nodes from the second half of the list. To prevent overruns, a safety link may be inserted at the end of the linked list in each buffer half (908/916). In the preferred embodiment, if the DMA channel reaches the safety link before the next half of the link chain has been updated by the host, the safety link may stop the DMA channel. It should be noted that this may potentially cause data overflows/underflows on the device DAQ HW. In another embodiment the safety link may pause the DMA channel and let it continue after the host has completed its update. Once the host updates the used half of the linked list, it may turn the safety link into a connection link allowing the DMA channel to continue without interruptions.

A minimum required size of the link buffer/remote heap for each channel may be calculated from the maximum required transfer rate and an acceptable number of link buffer/remote heap updates each second. If, for example, n updates/s are acceptable and the maximum data rate is N, the minimum remote heap size per DMA channel is $$Size_{Min} = \frac{2NSize_{Link}}{nD_{linkavg}}$$

For n=10 (one update every 100 ms), N=20 MB/s., $Size_{link}$= 12, and $D_{avglink}$=4096, $$Size_{Min} = \frac{2*20*1,000,000*12}{4096*10} = 11,700 \text{ bytes/DMA channel}$$

Using a remote heap (link buffer 322) for storing transfer links may eliminate linked list related overhead that can in the worst case grow up to 33% of the total bus bandwidth. Additionally, adding double-buffered support for the remote heap information may further empower IEEE 1394 device designers to perform design/cost tradeoffs.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A method for transferring data in a system including a host computer system coupled through a communication medium to a data acquisition device, the method comprising:

configuring a data acquisition device for a data input/output (I/O) operation, wherein the data acquisition device comprises a link buffer;

the host computer system preparing a plurality of transfer links, wherein each of the plurality of transfer links specifies a transfer of data between the data acquisition device and the host computer system;

transferring a first portion of the plurality of transfer links from the host computer system to a first portion of the link buffer of the data acquisition device over the communication medium;

the data acquisition device initiating the data I/O operation;

the data acquisition device executing the first portion of the plurality of transfer links from the first portion of the link buffer to transfer data between a data buffer in the data acquisition device and host memory in the host computer system; and transferring a second portion of the plurality of transfer links from the host computer system to a second portion of the link buffer of the data acquisition device over the communication medium, wherein at least a portion of said transferring the second portion of the plurality of transfer links and at least a portion of said executing the first portion of the plurality of transfer links are performed concurrently.

2. The method of claim 1, wherein said transferring the first portion of the plurality of transfer links to the first portion of the link buffer of the data acquisition device comprises the data acquisition device fetching the first portion of the plurality of transfer links to the first portion of the link buffer of the data acquisition device.

3. The method of claim 1,
wherein the data acquisition device initiating the data I/O operation comprises the host computer initiating a data acquisition process on the data acquisition device;
wherein the data acquisition device comprises a DMA Controller; and
wherein the data acquisition device executing the first portion of the plurality of transfer links from the first portion of the link buffer comprises:
the data acquisition device acquiring data and storing the data in the data buffer; and
the DMA Controller executing the first portion of the plurality of transfer links to transfer the data over the communication medium to the host memory in the host computer.

4. The method of claim 1,
wherein the data acquisition device initiating the data I/O operation comprises the host computer initiating a data acquisition process on the data acquisition device;
wherein the data acquisition device comprises a DMA Controller; and
wherein the data acquisition device executing the first portion of the plurality of transfer links from the first portion of the link buffer comprises:
the data acquisition device notifying the DMA Controller;
the data acquisition device requesting data from the DMA Controller; and
the DMA Controller executing the first portion of the plurality of transfer links to transfer the data from the host memory in the host computer system to the data buffer of the data acquisition device.

5. The method of claim 1, further comprising:
the data acquisition device executing the second portion of the plurality of transfer links from the second portion of the link buffer to transfer data between the data buffer in the data acquisition device and host memory in the host computer system; and
transferring a third portion of the plurality of transfer links from the host computer system to the first portion of the link buffer of the data acquisition device over the communication medium, wherein at least a portion of said transferring the third portion of the plurality of transfer links and at least a portion of said executing the second portion of the plurality of transfer links are performed concurrently.

6. The method of claim 5,
wherein the data acquisition device alternates between executing all transfer links from the first portion of the link buffer and all transfer links from the second portion of the link buffer, while the host computer system alternates between transferring transfer links from the host computer system to the second portion of the link buffer and transferring transfer links from the host computer system to the first portion of the link buffer, until there are no more transfer links to transfer from the host computer system.

7. The method of claim 6,
wherein each transfer link comprises at least one of a source address or a destination address, a count of a number of bytes in the transfer, and a pointer to a subsequent transfer link.

8. The method of claim 6,
wherein one or more of the plurality of transfer links comprises a self configuration link, wherein the self configuration link comprises one or more instructions to move data to, from, or between DMA Controller registers of a DMA Controller.

9. The method of claim 8,
wherein the self configuration link is inserted at the end of the first portion of the plurality of transfer links; and
wherein the DMA Controller executes the first portion of the plurality of transfer links on a DMA channel;
the method further comprising:
if the DMA channel reaches the self configuration link before the host computer system has finished transferring the second portion of the plurality of transfer links to the second portion of the link buffer, the self configuration link stopping the DMA channel to prevent data overruns.

10. The method of claim 8,
wherein the self configuration link is inserted at the end of the second portion of the plurality of transfer links; and
wherein the DMA Controller executes the second portion of the plurality of transfer links on a DMA channel;
the method further comprising:
if the DMA channel reaches the self configuration link before the host computer has finished transferring the third portion of the plurality of transfer links to the first portion of the link buffer, the self configuration link stopping the DMA channel to prevent data overruns.

11. The method of claim 8,
wherein the self configuration link is inserted in the first portion of the plurality of transfer links; and
wherein the DMA Controller executes the first portion of the plurality of transfer links on a DMA channel;
the method further comprising:
when the DMA channel reaches the self configuration link, notifying the host computer system to begin transferring the second portion of the plurality of transfer links to the second portion of the link buffer.

12. The method of claim 8,
wherein the self configuration link is inserted in the second portion of the plurality of transfer links; and
wherein the DMA Controller executes the second portion of the plurality of transfer links on a DMA channel;
the method further comprising:
when the DMA channel reaches the self configuration link, notifying the host computer system to begin transferring the third portion of the plurality of transfer links to the first portion of the link buffer.

13. The method of claim 1,
wherein the communication medium comprises an IEEE 1394 bus, which is compliant with an IEEE 1394 protocol specification.

14. The method of claim 13,
wherein the data acquisition device comprises a PCI device,
wherein the data acquisition device further comprises a PCI/394 translator;
the method further comprising the PCI/1394 translator translating messages between the IEEE 1394 protocol and PCI, thereby providing a mechanism for communication between the IEEE 1394 bus and the PCI device.

15. A system for transferring data over a communication medium, the system comprising:
a data acquisition device coupled to a first end of the communication medium, wherein the data acquisition device comprises a link buffer; and
a host computer system coupled to a second end of the communication medium, wherein the host computer system is operable to communicate through the communication medium to the data acquisition device;
wherein the host computer system is further operable to prepare a plurality of transfer links and transfer a first portion of the plurality of transfer links to a first portion of the link buffer of the data acquisition device, wherein each of the plurality of transfer links specifies a transfer of data between the data acquisition device and the host computer system;
wherein the data acquisition device is operable to execute the first portion of the transfer links;
wherein the host computer system is further operable to transfer a second portion of the plurality of transfer links to a second portion of the link buffer of the data acquisition device; and
wherein at least a portion of said executing the first portion of the transfer links and at least a portion of said transferring the second portion of the plurality of transfer links to the second portion of the link buffer of the data acquisition device are performed concurrently.

16. The method of claim 15, wherein said host computer system being operable to transfer the first portion of the plurality of transfer links to the first portion of link buffer of the data acquisition device comprises the data acquisition device being operable to fetch the first portion of the plurality of transfer links to the first portion of the link buffer of the data acquisition device.

17. The system of claim 15,
wherein the host computer system is further operable to:
configure the data acquisition device for data input/output; and
initiate a data I/O operation on the data acquisition device, after the host computer system transfers the first portion of the plurality of transfer links to the first portion of the link buffer of the data acquisition device.

18. The method of claim 17,
wherein the host computer system being operable to initiate the data I/O operation comprises the host computer system being operable to initiate a data acquisition process on the data acquisition device;
wherein the data acquisition device comprises a DMA Controller; and
wherein the data acquisition device being operable to execute the first portion of the plurality of transfer links from the first portion of the link buffer comprises:
the data acquisition device being operable to acquire data and store the data in a data buffer in the data acquisition device; and
the DMA Controller being operable to execute the first portion of the plurality of transfer links to transfer the data over the communication medium to the host a memory in the host computer system.

19. The system of claim 17,
wherein the host computer system being operable to initiate the I/O operation on the data acquisition device comprises the host computer system being operable to initiate a data generation operation on the data acquisition device;
wherein the data acquisition device comprises a DMA Controller; and
wherein the data acquisition device being operable to execute the first portion of the plurality of transfer links from the first portion of the link buffer comprises:
the data acquisition device being operable to notify the DMA Controller;
the data acquisition device being operable to request data from the DMA Controller; and
the DMA Controller being operable to execute the first portion of the plurality of transfer links to transfer the data from a memory of the host computer system to a data buffer of the data acquisition device.

20. The system of claim 15, wherein the data acquisition device is further operable to execute the second portion of the plurality of transfer links from the second portion of the link buffer;
wherein the host computer system is further operable to transfer a third portion of the plurality of transfer links to the first portion of the link buffer;
wherein the data acquisition device is further operable to execute the second portion of the plurality of transfer links from the second portion of the link buffer; and
wherein at least a portion of said executing the second portion of the plurality of transfer links from the second portion of the link buffer and at least a portion of said transferring the third portion of the plurality of transfer links to the first portion of the link buffer are performed concurrently.

21. The system of claim 20,
wherein the data acquisition device is further operable to alternate between executing all transfer links from the first portion of the link buffer and all transfer links from the second portion of the link buffer, while the host computer system is further operable to alternate between transferring transfer links from the host computer system to the second portion of the link buffer and from the host computer system to the first portion of the link buffer, until there are no more transfer links to transfer from the host computer system.

22. The system of claim 15,
wherein each transfer link comprises at least one of a source address or a destination address, a count of a number of bytes in the transfer, and a pointer to a subsequent transfer link.

23. The system of claim 15,
wherein one or more of the plurality of transfer links comprises a self configuration link, wherein the self configuration link comprises one or more instructions to move data to, from, or between DMA Channel registers of a DMA Controller.

24. The system of claim 23,
wherein the self configuration link is inserted at the end of the first portion of the plurality of transfer links;
wherein the DMA Controller executes the first portion of the plurality of transfer links on a DMA channel; and wherein if the DMA channel reaches the self configuration link before the host computer system has finished transferring the second portion of the plurality of transfer links to the second portion of the link buffer, the self configuration link stops the DMA channel to prevent data overruns.

25. The system of claim 23,
wherein the host computer system is further operable to transfer a third portion of the plurality of transfer links to the first portion of the link buffer;
wherein the self configuration link is inserted at the end of the second portion of the plurality of transfer links;
wherein, the DMA Controller executes the second portion of the plurality of transfer links on a DMA channel; and
wherein if the DMA channel reaches the self configuration link before the host computer system has finished transferring the third portion of the plurality of transfer links to the first portion of the link buffer, the self configuration link stops the DMA channel to prevent data overruns.

26. The system of claim 23,
wherein the self configuration link is inserted in the first portion of the plurality of transfer links;
wherein the DMA Controller is operable to execute the first portion of the plurality of transfer links on a DMA channel; and
wherein the DMA channel is operable to notify the host computer system to begin transferring the second portion of the plurality of transfer links to the second portion of the link buffer when the DMA channel reaches the self configuration link.

27. The system of claim 23,
wherein the host computer system is further operable to transfer a third portion of the plurality of transfer links to the first portion of the link buffer;
wherein the self configuration link is inserted in the second portion of the plurality of transfer links;
wherein the DMA Controller is operable to execute the second portion of the plurality of transfer links on a DMA channel; and
wherein the DMA channel is operable to notify the host computer system to begin transferring the third portion of the plurality of transfer links to the first portion of the link buffer when the DMA channel reaches the self configuration transfer link.

28. The system of claim 15,
wherein the communication medium comprises an IEEE 1394 bus, which is compliant with an IEEE 1394 protocol specification.

29. The system of claim 15,
wherein the data acquisition device comprises a PCI device,
wherein the data acquisition device further comprises a PCI/1394 translator; and
wherein the PCI/1394 translator is operable to translate messages between the IEEE 1394 protocol and PCI, thereby providing a mechanism for communication between the IEEE 1394 bus and the PCI device.

30. A method for transferring data in a system including a host computer system coupled through a communication medium to a data acquisition device, the method comprising:
configuring a data acquisition device for a data input/output (I/O) operation, wherein the data acquisition device comprises a link buffer;
the host computer system preparing a linked list of transfer nodes, wherein each of the linked list of transfer nodes includes a true address of physical memory of the host computer system;
the host computer system preparing a plurality of transfer links, wherein each of the plurality of transfer links specifies a transfer node and a transfer of data between the data acquisition device and the host computer system;
the host computer system transferring the plurality of transfer links to the link buffer of the data acquisition device over the communication medium;
the data acquisition device initiating the data I/O operation; and
the data acquisition device executing the plurality of transfer links from the link buffer to transfer data between a data buffer in the data acquisition device and the physical memory of the host computer system;
wherein, for each transfer node of the linked list of transfer nodes, the true address of the transfer node corresponds to a virtual address of a buffer, wherein the buffer spans contiguous virtual addresses mapping to the physical memory of the host computer system, wherein an Nth transfer node corresponds to an Nth virtual address of the buffer.

31. The method of claim 30, wherein said transferring the plurality of transfer links to the link buffer of the data acquisition device over the communication medium comprises the data acquisition device fetching the plurality of transfer links to the link buffer of the data acquisition.

32. The method of claim 30,
wherein the data acquisition device initiating the data I/O operation comprises the host computer system initiating a data acquisition process on the data acquisition device;
wherein the data acquisition device comprises a DMA Controller; and
wherein the data acquisition device executing the plurality of transfer links from the link buffer comprises:
the data acquisition device acquiring data and storing the data in the data buffer; and
the DMA Controller executing the plurality of transfer links to transfer the data over the communication medium to the physical memory of the host computer system.

33. The method of claim 30,
wherein the data acquisition device initiating the data I/O operation comprises the host computer system initiating a data acquisition process on the data acquisition device;
wherein the data acquisition device comprises a DMA Controller; and
wherein the data acquisition device executing the plurality of transfer links from the link buffer comprises:
the data acquisition device notifying the DMA Controller;
the data acquisition device requesting data from the DMA Controller, and
the DMA Controller executing the plurality of links to transfer the data from the physical memory of the host computer to the data buffer in the data acquisition device.

34. The method of claim 30, further comprising:
the host computer system preparing a second linked list of transfer nodes, wherein each of the second linked list of transfer nodes includes a true address of the physical memory of the host computer system;

the host computer system preparing a second plurality of transfer links, wherein each of the second plurality of transfer links specifies a transfer node of the second linked list and a transfer of data between the data acquisition device and the host computer system; and the host computer system transferring the second plurality of transfer links to the link buffer of the data acquisition device over the communication medium.

35. The method of claim 34, wherein at least a portion of said executing the plurality of transfer links from the link buffer to transfer data between the data buffer in the data acquisition device and the physical memory of the host computer system and at least a portion of said transferring the second plurality of transfer links to the link buffer of the data acquisition device over the communication medium are performed concurrently.

36. The method of claim 34, wherein, for each transfer node of the second linked list of transfer nodes, the true address of the transfer node corresponds to a virtual address of a buffer, wherein the buffer spans contiguous virtual addresses mapping to the physical memory of the host computer system, wherein an Mth transfer node corresponds to an Mth virtual address of the buffer.

37. The method of claim 34, wherein said transferring the plurality of transfer links to the link buffer of the data acquisition device over the communication medium comprises transferring the plurality of transfer links to a first portion of the link buffer of the data acquisition device; and wherein said transferring the second plurality of transfer links to the link buffer of the data acquisition device over the communication medium comprises transferring the second plurality of transfer links to a second portion of the link buffer of the data acquisition device;

the method further comprising:

the data acquisition device executing the second plurality of transfer links from the second portion of the link buffer to transfer data between the data buffer in the data acquisition device and the physical memory of the host computer system;

the host computer system preparing a third linked list of transfer nodes, wherein each of the third linked list of transfer nodes includes a true address of the physical memory of the host computer system;

the host computer system preparing a third plurality of transfer links, wherein each of the third plurality of transfer links specifies a transfer node of the third linked list and a transfer of data between the data acquisition device and the host computer system; and the host computer system transferring the third plurality of transfer links to the first portion of the link buffer of the data acquisition device over the communication medium.

38. The method of claim 37, wherein at least a portion of said executing the second plurality of transfer links from the second portion of the link buffer to transfer data between the data buffer in the data acquisition device and the physical memory of, the host computer system and at least a portion of said transferring the third plurality of transfer links to the first portion of the link buffer of the data acquisition device over the communication medium are performed concurrently.

39. The method of claim 37, wherein, for each transfer node of the third linked list of transfer nodes, the true address of the transfer node corresponds to a virtual address of a buffer, wherein the buffer spans contiguous virtual addresses mapping to the physical memory of the host computer system, wherein a Pth transfer node corresponds to a Pth virtual address of the buffer.

40. The method of claim 37, wherein the data acquisition device alternates between executing all transfer links from the first portion of the link buffer and all transfer links from the second portion of the link buffer, while the host computer system alternates between transferring transfer links from the host computer system to the second portion of the link buffer and transferring transfer links from the host computer system to the first portion of the link buffer, until there are no more transfer links to transfer from the host computer system.

41. The method of claim 40, wherein each transfer link comprises at least one of a source address or a destination address, a count of a number of bytes in the transfer, and a pointer to a subsequent transfer link.

42. The method of claim 40, wherein one or more of the of transfer links comprises a self configuration link, wherein the self configuration link comprises one or more instructions to move data to, from, or between DMA Controller registers of a DMA Controller.

43. The method of claim 42, wherein the self configuration link is inserted at the end of the plurality of transfer links;

wherein the DMA Controller executes the plurality of transfer links on a DMA channel; and wherein if the DMA channel reaches the self configuration link before the host computer system has finished transferring the second plurality of transfer links to the second portion of the link buffer, the self configuration link stopping the DMA channel to prevent data overruns.

44. The method of claim 42, wherein the self configuration link is inserted at the end of the second plurality of transfer links;

wherein the DMA Controller executes the second plurality of transfer links on a DMA channel; and wherein if the DMA channel reaches the self configuration link before the host computer system has finished transferring the third plurality of transfer links to the first portion of the link buffer, the self configuration link will stop the DMA channel to prevent data overruns.

45. The method of claim 43, wherein the self configuration link is inserted in the plurality of transfer links; and wherein the DMA Controller executes the plurality of transfer links on a DMA channel;

when the DMA channel reaches the self configuration link, notifying the host computer system to begin transferring the second plurality of transfer links to the second portion of the link buffer.

46. The method of claim 42, wherein the self configuration link is inserted in the second plurality of transfer links; and wherein the DMA Controller executes the second plurality of transfer links on a DMA channel;

the method further comprising:

when the DMA channel reaches the self configuration link, notifying the host computer system to begin transferring the third plurality of transfer links to the first portion of the link buffer.

47. The method of claim 30, wherein the communication medium comprises an IEEE 1394 bus, which is compliant with an IEEE 1394 protocol specification.

48. The method of claim 47, wherein the data acquisition device comprises a PCI device; and wherein the data acquisition device further comprises a PCI/1394 translator;

the method further comprising:

the PCI/1394 translator translating messages between the IEEE 1394 protocol and PCI, thereby providing a mechanism for communication between the IEEE 1394 bus and the PCI device.

\* \* \* \* \*

UNITED STATES PATENT AND TRADEMARK OFFICE
CERTIFICATE OF CORRECTION

PATENT NO. : 6,839,777 B1
DATED : January 4, 2005
INVENTOR(S) : Vranic et al.

It is certified that error appears in the above-identified patent and that said Letters Patent is hereby corrected as shown below:

Column 15,
Line 5, please delete "PCI/394 translator;" and substitute -- PCI/1394 translator --.

Signed and Sealed this

Fifth Day of April, 2005

JON W. DUDAS
*Director of the United States Patent and Trademark Office*